(12) United States Patent
Guday et al.

(10) Patent No.: US 12,423,534 B2
(45) Date of Patent: Sep. 23, 2025

(54) DYNAMIC BINDING FOR COMPUTER-READABLE TAGS

(71) Applicants: Shai Guday, Redmond, WA (US); Tali Guday, Redmond, WA (US)

(72) Inventors: Shai Guday, Redmond, WA (US); Tali Guday, Redmond, WA (US)

( * ) Notice: Subject to any disclaimer, the term of this patent is extended or adjusted under 35 U.S.C. 154(b) by 0 days.

(21) Appl. No.: 18/464,903

(22) Filed: Sep. 11, 2023

(65) Prior Publication Data

US 2025/0086409 A1    Mar. 13, 2025

(51) Int. Cl.
*G06K 7/10* (2006.01)

(52) U.S. Cl.
CPC ............................. *G06K 7/10366* (2013.01)

(58) Field of Classification Search
None
See application file for complete search history.

(56) References Cited

U.S. PATENT DOCUMENTS

2010/0156611 A1*  6/2010  Tsujimoto .............. G06K 7/006
340/10.42

\* cited by examiner

*Primary Examiner* — Kristy A Haupt
(74) *Attorney, Agent, or Firm* — James Haugen; Seattle Patent Group

(57) ABSTRACT

Devices, systems, and techniques are described for dynamic binding for computer-readable tags. A computer-readable tag may be associated with an item by scanning the tag while information about the item is open on a computing device, or by scanning the computer-readable tag and a second tag associated with the item. This may allow, for example, retailers to effectively update data associated with a computer-readable tag at the time of a sale.

3 Claims, 9 Drawing Sheets

500

510
Confirm validity of a user ID

520
Initialize client application in response to a signal from a platform tag reader associated with a computing device

530
Receive tag information from a readable tag through the platform tag reader associated with the computing device

540
Transmit information regarding a tag ID, the valid user ID, and device capabilities of the computing device to a web interface as a download request

550
Receive a compressed theme package and theme metadata from a cloud service

560
Decompress, disassemble, and install the theme package on the computing device

FIG. 5

DYNAMIC BINDING FOR COMPUTER-READABLE TAGS

FIELD

This disclosure relates generally to dynamic binding for computer-readable tags.

BACKGROUND

Near Field Communication (NFC) and other short-range wireless technologies are commonly used for a variety of purposes, serving as the basis for contactless payments or as a means to initiate activities such as browsing, advertising, or downloading applications on mobile devices and appliances. This is achieved by embedding an NFC supporting integrated circuit chip with a coil antenna on a substrate, which may be plastic, self-adhesive paper, or some other material. The combined assembly is known as an NFC tag.

When brought into proximity with an NFC supporting powered device, the radio frequency waves charge the coil, power the chip, and transfer the information wirelessly to the supporting device, where the appropriate action may be taken.

To achieve this scenario, the party creating the tags must store custom content on each tag that is unique to the specific action and activity that they intend to initiate on the supporting device.

For example, the vendor must create a custom Uniform Resource Indicator (URI) for each distinct advertisement they are marketing and write the correct one to each tag. Tracking this at production time introduces additional cost and complexity into the manufacturing process and tracking cost and complexity into the distribution process. Alternatively, the tags can be written at a later point in time by the distributor, but that introduces additional cost and logistical complexity into the distribution operations.

Computing devices such as smartphones and wearable devices possess generic uniformity of style in a limited range of colors. External customization may be achieved with cases, handle grips, or wrist bands of varying colors or designs. Internal customization may be achieved with personalized ringtones and screensavers or wallpapers. However, to synchronize customization, a user must often access several sources, e.g., a store for phone accessories and a website for ringtones or screen savers.

Previous attempts at simplifying this process have been described, mostly faceplates, sleeves, or covers for smartphones having a data tag that could facilitate personalization of at least one aspect of a smartphone (U.S. Pat. No. 8,620,215). However, the previously described data tags had to be periodically queried to determine whether the functionality required by the tags should be continued to be performed, and removal of the faceplate, sleeve, or cover ceased the personalization. Furthermore, each of the data tags required custom data to be written on each tag, introducing additional cost and complexity to the manufacturing process.

SUMMARY

The following presents a simplified summary of the disclosure to provide a basic understanding to the reader. This summary is not an extensive overview of the disclosure, nor does it identify key or critical elements of the claimed subject matter or define its scope. Its sole purpose is to present some concepts disclosed in a simplified form as a precursor to the more detailed description that is later presented.

Disclosed herein are devices, systems, and techniques for providing customized content using a computer-readable tag associated with an initiator component. The computer-readable tag can be read wirelessly, digitally, or optically by a computing device. The computer-readable tag may include information that allows the computing device to access customized content from a database. A database may be any form of non-transient computer storage configured to store content.

For example, content may include a theme providing customized user experiences, for example, a customized visual display, home screen, lock screen, application icons, default ring tone, or alert ringtone for a smartphone. In another example, a pharmacy may put a radio frequency identification (RFID) tag on a bottle of medicine, a bottle cap, or a label for the bottle. Rather than programming the tag at the pharmacy, the pharmacy may simply register the prescription for the medicine in the bottle with the specific tag on the bottle, allowing the pharmaceutical information specific to the prescription to be retrieved dynamically when a user scans the tag.

BRIEF DESCRIPTION OF THE DRAWINGS

The present description may be better understood from the following detailed description read in light of the appended drawings, wherein:

FIG. 5 shows a method for customizing a device.

Figure 1:
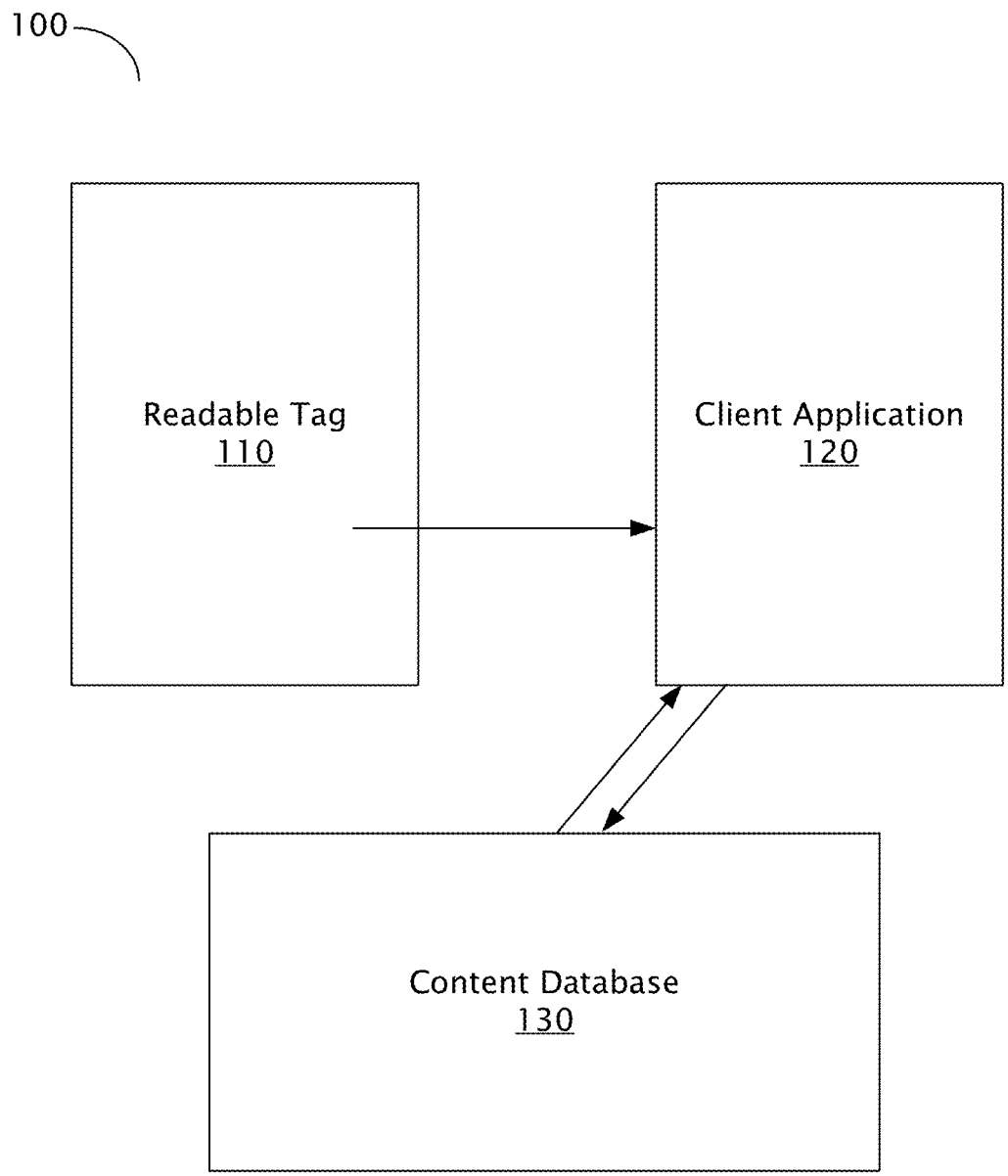
FIG. 1 shows an example of a system that may support dynamic binding for computer-readable tags.

The drawing figures are not necessarily to scale. Certain features or components herein may be shown in schematic form, and some details of conventional elements may not be shown in the interest of clarity, explanation, and conciseness. The figures are hereby made part of the specification, written description, and teachings disclosed herein.

DETAILED DESCRIPTION

A more particular description of certain implementations of systems, devices, and methods for customization of a device may be had by reference to the implementations shown in the drawings that form a part of this specification, in which like numerals represent like objects.

FIG. 1 shows an example of a system that may support dynamic binding for computer-readable tags.

System 100 may include Computer-Readable Tag 110, Client Application 120, and Content Database 130, which may include, for example, a theme, ads, apps, or other content. Client Application 120 may include various modules to allow reading, updating, deleting records from, or adding records to a database, as well as providing a user interface. Different modules may be available for different types of users.

In one implementation, Client Application 120 running on Computing Device 220 may receive information from Computer-Readable Tag 110, which may include Tag ID 205. Client Application 120 may use Tag ID 205 to retrieve associated content from Content Database 130, for example, a theme package including themed content for Computing Device 220 or an associated device, information about interactions for a particular medicine, or instructions for putting together a birdhouse from a kit.

System 100 may include Computer-Readable Tag 110 encoded with data. Computer-Readable Tag 110 may be a secure tag, which may have a secure ID that is cryptographically signed and verified by the manufacturer. Alternatively, Computer-Readable Tag 110 may not be secure and may be more easily spoofed, for example, for less valuable content.

Readable Tag 110 may be a passive device. Computer-Readable Tag 110 may include an intrinsic tag identification, Tag ID 205. The intrinsic Tag ID 205 may include a unique identifier linked to a theme or other content. The unique identifier may be comprised of numbers, letters, symbols, or a combination thereof. Computer-Readable Tag 110 may include an NFC tag. In some embodiments, Computer-Readable Tag 110 may be an RFID tag. In some embodiments, Computer-Readable Tag 110 may be a computer-readable code, e.g., a bar code or QR code or similar patterned code readable by a computing device. Computer-Readable Tag 110 may be read by an enabled reader associated with a computing device. For example, Computer-Readable Tag 110 may be an NFC tag readable by an NFC-enabled reader on a smartphone or other computing device. For example, Computer-Readable Tag 110 may be an NFC tag, including Tag ID 205 as an intrinsic attribute of the tag and an NDEF record (as defined by the NFC forum) with no additional tag customization. For example, the specific record may include an Android Activation Record (AAR) for either launching a registered application installed on an Android device or launching a Google Play application to take the user to a page needed to install an application. For example, the specific record may include a universal link or a custom MIME type.

Client Application 120 may be associated with Computing Device 220 and may include various modules, including modules configured to access Content Database 130 based on information received from Computer-Readable Tag 110, or modules configured to download a theme package or other content from Content Database 130 onto Computing Device 220. For example, Client Application 120 may be software associated with and running on Computing Device 220. Client Application 120 may include modules configured to detect trigger event specifics in response to Computer-Readable Tag 110 being "read" by Computing Device 220. For example, Client Application 120 can include modules configured to read details from an NFC tag, an RFID tag, or a computer-readable code. Client Application 120 may include modules to use the trigger information to retrieve a theme package or other content from Cloud Service 230 and apply the theme package. Client Application 120 may include modules configured to allow a user to manage, preview, and organize themes that have been downloaded to Computing Device 220.

In some embodiments, Client Application 120 may be a stand-alone application that may be downloadable from an application source or store. For example, Client Application 120 may be downloadable from a Google or Apple application store. In some embodiments, Client Application 120 is a service within a client platform, wherein the application software is built into an existing platform. For example, Client Application 120 may be built into a smartphone or other computing device platform or included in a software update to a smartphone or other computing device. For example, Client Application 120 may be included as an addition to a generic Android release or other platform update.

System 100 may include Content Database 130. Content Database 130 may include content, for example, theme packages, instructions, videos, or other types of content that may be downloaded to Computing Device 220 in response to communication with Client Application 120. Theme packages may include themed imagery or audio content, for example. Content Database 130 may be stored on a server accessible to Computing Device 220, which may, for example, be on a local network, at a point of sale, on a global network, part of a cloud network system, on the world wide web, or the Internet. The server may include authorization or authentication procedures prior to enabling a download of content. In some embodiments, the themed imagery, audio content, or other content may be stored in a filesystem.

Figure 2:
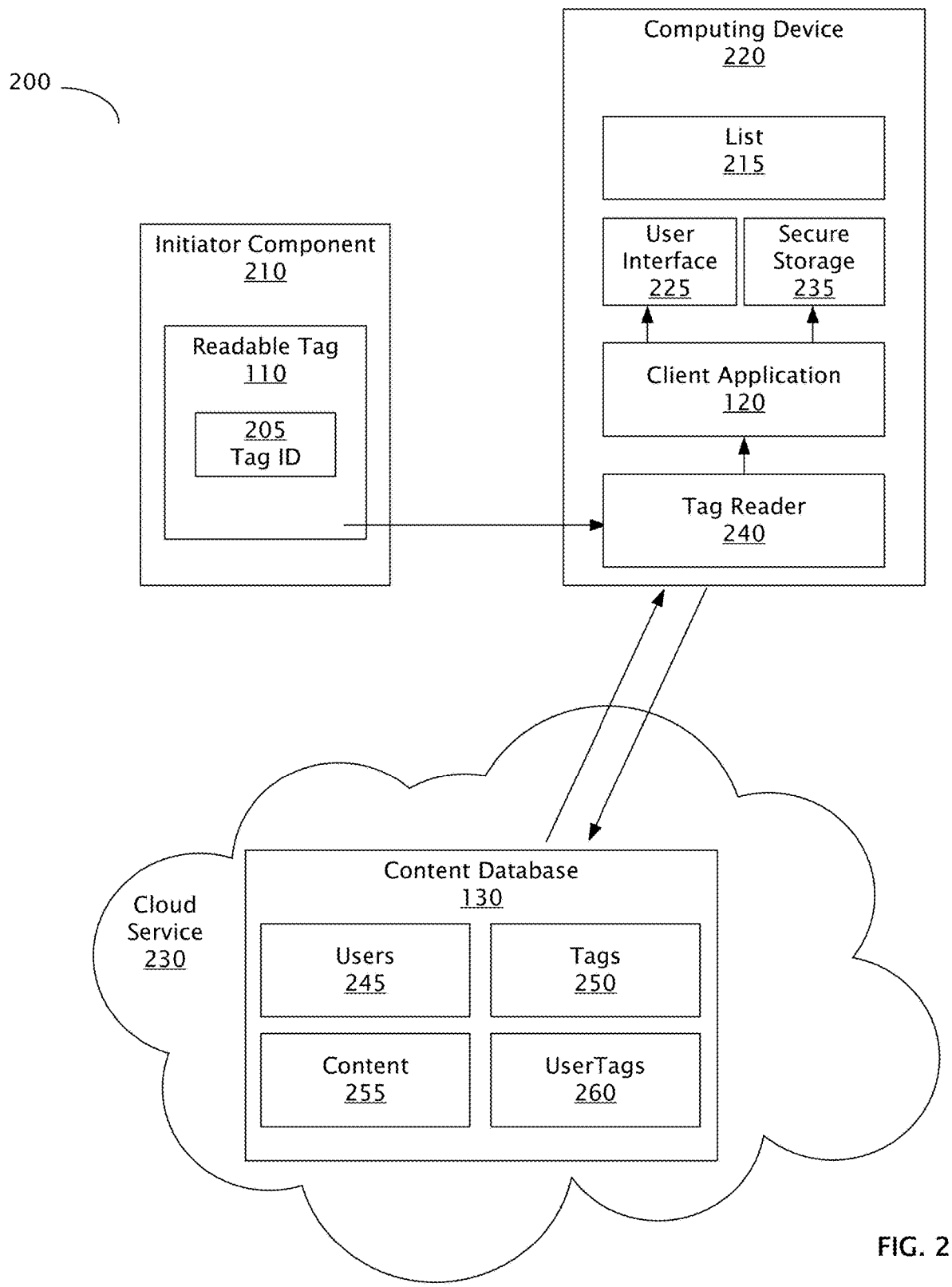
FIG. 2 is a diagram showing further aspects of a system such as depicted in FIG. 1.

With reference to FIG. 2, shown are further aspects of a system such as shown in FIG. 1. System 200 may include Initiator Component 210 and Computing Device 220. Initiator Component 210 may include Computer-Readable Tag 110, which may be readable by a reader (e.g., Tag Reader 240), which may be functionally coupled with Computing Device 220 through wireless or wired connections. Computer-Readable Tag 110 may include information providing Computing Device 220 access to Content Database 130. Computer-Readable Tag 110 may further include Tag ID 205 associated with a specific theme or themes within Content Database 130. Computing Device 220 may include Client Application 120, which may be capable of accessing Content Database 130 made available on Cloud Service 230 by way of a network, for example, the Internet.

Initiator component 210 may include any of a number of devices or objects capable of including Computer-Readable Tag 110. In some embodiments, Initiator Component 210 may be an accessory to a computing device. For example, Initiator Component 210 may include an accessory to a smartphone, e.g., a case, a grip, a stand, or a handle, or an accessory to a smartwatch or wearable health monitor, e.g., a wrist band. The accessory may include imagery associated with a theme, e.g., a brand, a team, a celebrity, a politician or political party, a superhero, or a cartoon character. For example, a user may choose a pop grip with themed imagery, wherein the pop grip further includes Computer-Readable Tag 110 that allows for content associated with the theme to be downloaded from Content Database 130 onto an associated smartphone. Other examples of Initiator Component 210 may include changeable wrist bands associated with a smartwatch or health monitoring device, a mouse or mouse pad associated with a computer, or a stylus associated with a tablet or laptop computer.

In some embodiments, Initiator Component 210 is not an accessory to Computing Device 220. For example, Initiator Component 210 may be a keychain or keychain fob. For example, a keychain itself may include imagery or a logo associated with a theme (e.g., an automobile or motorcycle brand or model), which may further include Computer-Readable Tag 110 that allows for content associated with the theme to be downloaded onto a computing device. In some embodiments, Initiator Component 210 may include a card (e.g., a business card) associated with a theme (e.g., a company or brand), which further includes Computer-Readable Tag 110 that allows for content associated with the theme to be downloaded onto a computing device. Other examples of Initiator Component 210 with computer-readable tags to allow brand or company theme content to be downloaded to a computing device include bags, pens, notepads, or other "give away" or "swag" branding items. In some embodiments, Initiator Component 210 may include a ticket (e.g., a concert or theater ticket) that allows for content associated with the ticket (e.g., the concert performer(s), actors, music, or imagery) to be downloaded onto Computing Device 220. Other examples of Initiator Component 210 may include toys, books, apparel, or sports equipment. Computer-Readable Tag 110 may be directly attached or incorporated into or onto Initiator Component 210 in some embodiments. In some embodiments, Computer-Readable Tag 110 may be attached to removable packaging associated with Initiator Component 210.

In some embodiments, Computer-Readable Tag 110 may be associated with a gift card or gift card packaging. In one embodiment, the gift card entity (e.g., a store or entertainment enterprise) may provide an incentive for a user to access a theme that may be directly tied to the entity's brand or tied to another brand as part of a cross-promotional activity. For example, a movie theater gift card might provide access to a theme package with theme content associated with a new movie coming to cinemas to promote the new movie. The downloading of the theme package may be user authenticated so that a tag provider can gain knowledge of customer market information on behalf of the movie theater and, in the case of a specific movie theme, the production studio. Alternatively, Computer-Readable Tag 110 may be placed within a cinema venue (e.g., on a movie poster) and could be used as an opportunity to harvest data about moviegoers and their preferences. Computer-Readable Tag 110 representation within the database may contain a setting to relax a service requirement that binds tags to users on a 1:1 basis when the tag represents a class of public tag assets.

In some embodiments, Initiator Component 210 may be a digital component. For example, a digital component may be part of an email or email attachment (e.g., a pdf document). For example, the digital component may be a URI or some form of digital certificate that may be signed by a trusted Certificate Authority. Client Application 120 associated with the Computing Device 220 may use the Certificate Authority to authenticate the Certificate Authority signature on the server certificate as part of the authorization before launching a secure connection. If it is a certificate and has the right mime-type, when the user taps on that email attachment, Client Application 120 may pick it up and treat it exactly like a tag. In some embodiments, a URI may be used to download or apply a theme to Computing Device 220. The URI may be a well-defined URI type based on existing NFC Forum NDEF messages and may be able to launch the browser and point it at content. The URI may specify or include a Tag ID or specify or include a "public Tag ID," which also maps a Tag ID to a specific theme.

In some embodiments, Computing Device 220 may not have the ability to independently read the Computer-Readable tag but may be in communication with another computing device with that capability. In some embodiments, the theme package may be indirectly applied to such a device when Computer-Readable Tag 110 is introduced to or read by the capable device. For example, a smartphone may have the capability of reading Computer-Readable Tag 110 associated with Initiator Component 210 (e.g., a key fob for a specific car brand), accessing Content Database 130, and downloading a theme package including theme components or elements (e.g., imagery of the specific car brand) to a paired device, e.g., a smartwatch or a health monitoring device.

Returning to FIG. 2, Computer-Readable Tag 110 may include Tag ID 205. Tag ID 205 may be an intrinsic attribute of all tags. For example, Tag ID 205 may be an intrinsic attribute of an NFC tag. Tag ID 205 may be a unique identifier comprised of numbers, letters, symbols, or a combination thereof and associated with a specific theme. Based on software running on a computing device (e.g., an application), Computing Device 220 performs an action based on the data encoded onto the tag. For example, a tag (e.g., an NFC tag) may be encoded with a website address or URL that the computing device opens in a browser. In some embodiments, an AAR or similar component may be written to all tags being used. In some embodiments, an NFC Data Exchange Format may be encoded on the NFC tags.

Readable Tag 110 and associated Tag ID 205 may be assigned a theme in advance or at the time of manufacturing of Initiator Component 210 to which Computer-Readable Tag 110 is attached or incorporated. The theme may match the graphics and the device types of Initiator Component 210. For example, a smartphone grip may include thematic graphics and include Computer-Readable Tag 110 for implementing the same theme to a smartphone.

System 200 may further include Computing Device 220. The computing device may include any of a number of computing devices that have access to a server and includes some means for a user experience. In an embodiment, Computing Device 220 may include a personal communication device, e.g., a smartphone. Computing Device 220 may comprise a wearable device, e.g., a smartwatch or fitness tracker. Computing Device 220 may comprise a health or wellness device, e.g., a blood sugar monitor, a health monitor, or an exercise monitor. Computing Device 220 may comprise a traditional computing device, e.g., a laptop, tablet, or desktop computing device. Computing Device 220 may comprise computing devices with User Interface 225 associated with an appliance, e.g., a refrigerator, oven, stove, microwave, dishwasher, washer, or dryer. Computing Device 220 may comprise User Interface 225 associated with a transport vehicle. User Interface 225 or other means for a user experience associated with Computing Device 220 may include a visual (e.g., display) or audio interface that may be customized based on the desired theme. In some embodiments, Computing Device 220 that is an appliance or a transport vehicle may indirectly receive the theme content through a paired device such as, e.g., a smartphone. Further aspects of Computing Device 220 are described below with regards to FIG. 6.

Computing device 220 may comprise List 215, User Interface 225, Secure Storage 235, Client Application 120, and Tag Reader 240. List 215 may include a list or visual display of the theme packages downloaded on the computing device. In one embodiment, a list of theme packages may be displayed as text. In one embodiment, a list of theme packages is displayed as text combined with imagery, e.g., a thematic icon. User Interface 225 may be one or more types of user interfaces through which a user can experience the theme content of a theme package. The User Interface 225 may include a means to display theme content. For example, User Interface 225 may be a display window associated with the computing device. The User Interface 225 may include a means to hear theme content. For example, User Interface 225 may be a speaker associated with Computing Device 220.

Computing Device 220 may include Client Application 120. Client Application 120 may run on the computing device and interface with a server or Cloud Service 230 to access and download themed content from Content Database 130. When Computing Device 220 is brought into proximity of Computer-Readable Tag 110 associated with Initiator Component 210, in the event that a client capability (e.g., Client Application 120) has not been preinstalled or is part of the platform as a platform service, a user may be guided to an application store to confirm the download and installation of an appropriate application. When installed, Client Application 120 may first secure all the permissions needed to function (e.g., device storage access, Internet access, ringtone setting access, etc.), from the user, and may then register the user's primary identity (user ID), the device identity (device ID), and the country, by contacting a cloud web service with a registration request. In some embodiments, registration may be used to combat fraud. In some embodiments, registration may be used to allow a user to recover previously selected themes. Other functionalities of Client Application 120 may include a save mode for sending theme packages to storage/memory on Computing Device 220, a retrieve mode for accessing previously-stored theme packages, a display mode for a list display of the various downloaded theme packages, an autosave mode for autosaving a current theme when a new theme ID is downloaded, an auto-apply mode for deciding whether to auto-apply a new theme immediately, and a preview mode for allowing a user to preview theme contents of a theme package.

In some embodiments, an application that allows for initialization of Client Application 120 may already exist on Computing Device 220. During this operation, Client Application 120 may confirm that the user identity is valid. In some embodiments, the user ID may be represented by an identity token that is unique to Client Application 120 and the user ID. The identity token may be used to prove a user's identity and authenticating that user for access to Content Database 130. The identity token may also refer to a security token or authentication token. For example, a user's login credentials may be associated with another service (e.g., Google ID) that may be able to locally authenticate or validate the user and issue an identity token unique to Client Application 120 and the user. The identity token may be used instead of the user's login credentials to interact with a web-based Content Database 130. User identities or identity tokens may be revoked if fraud was detected that is tied to a user's account. Client Application 120 may exit or close in that event, and all the theming functionality provided may be suspended.

In some embodiments, Client Application 120 may include modules configured to transmit to and receive information from a server (e.g., a cloud server or service), including Content Database 130. For example, Client Application 120 may include modules configured to confirm validity of a user ID; modules configured to initialize a Client Application 120 in response to a signal from platform Tag Reader 240 associated with Computing Device 220; modules configured to receive tag information from Computer-Readable Tag 110 through the platform Tag Reader 240 associated with the computing device; modules configured to transmit information regarding a Tag ID, the valid user ID, and device capabilities of Computing Device 220 to a web interface as a download request; modules configured to receive a compressed theme package and theme metadata from Cloud Service 230; or modules configured to decompress, disassemble, and install the theme package on Computing Device 220. Client Application 120 may include modules configured to autosave the current theme when a new theme ID is downloaded. Client Application 120 may include modules configured to auto-apply a new theme immediately. Client Application 120 may include modules configured to provide a preview mode to a user, including a preview of theme contents of a theme package.

Readable Tag 110 may be accessed by Tag Reader 240 associated with computing device 220 and Tag ID 205. Client Application 120 may upload the specifics of Tag ID 205 along with an authentication token and device capabilities of the computing device to a web interface as a download request. Cloud Service 230 may validate the user ID and the Tag ID 205, confirm that the Tag ID has been assigned to a theme and to a device of the same category, assemble a theme package consisting of a collection of theme content tailored for the device's capabilities (e.g., screen resolution, aspect ratio, dimensions, and the like), and assemble a manifest computer file containing theme metadata.

In some embodiments, Content Database 130 may include stored information or data, including Users 245, Tags 250, Content 255, and UserTags 260. Users 245 may include a list or lookup table of verified/authorized users. Users 245 may contain a user ID or identity token (e.g., a Firebase token) for a specific user in Client Application 120, the user's device ID, and the user's language locale. It may be used to compare with a user ID or identity token transmitted from a Client Application 120 running on Computing Device 220. Users 245 may also include information regarding users of the database, e.g., preferences, frequency of use, and the like. In some embodiments, the information regarding the users may be provided to a third party, e.g., an entity that owns a particular theme. Tags 250 may include a list or lookup table of Tag IDs 205 or tag identifiers matched to specific themes. In some embodiments, Tags 250 may further include a value for relaxing 1:1 binding for a Tag ID 205 to a specific user. UserTags 260 may include mapping of users to tags, specifically for 1:1 bindings in which a specific Tag ID 205 is associated with a specific user. Content Database 130 may further include information regarding device capabilities. Device capabilities may include a list or lookup table of capabilities of different makes, models, and capabilities of various computing devices. For example, the device capabilities might include information regarding screen or display resolution of specific computing devices so as to provide theme content at the appropriate resolution. Content 255 may include text files, audio files, video files, themes, or any other type of content matched with Tag IDs 205. Themes may include theme packages, including audio or visual content associated with the theme.

In one embodiment, Client Application 120 associated with computing device 220 may provide Tag ID 205, user ID, and device ID information to Content Database 130. A received user ID may be registered, verified, or authorized in comparison to users 245 in Content Database 130. A lookup function may be used to compare a received Tag ID 205 and device ID with Tags 250 and UserTags 260 in the database and an appropriate content package assembled from Content 255. The content package may include audio or visual content that may then be transmitted back to the computing device.

In one embodiment, Content Database 130 or a cloud server or service storing Content Database 130 may include modules configured to receive information from a computing device, process the received information, and transmit content packages back to the computing device. For example, the modules may include modules configured to verify and authorize a user ID and device ID with Cloud Service 230; modules configured to receive information from a Client Application 120 on a computing device, the received information including Tag ID 205, a user ID, and device capabilities of the computing device; modules configured to validate the Tag ID; modules configured to confirm that the Tag ID has been assigned to content; modules configured to assemble a content package based on the received Tag ID and the device capabilities; modules configured to assemble a manifest containing content metadata; or modules configured to transmit the content package and the content metadata to the computing device. The device capabilities may include make or model of the computing device, screen resolution of the computing device, and the like. The modules may further include modules configured to gather telemetry as part of a cloud solution. The modules may include modules configured to detect fraud. For example, the modules may be configured to detect a user using a computing device to illegally register tags on items/objects on a store shelf and revoke the user ownership in Content Database 130.

In some embodiments, a security means (e.g., an authorization protocol such as OAuth2) may be included for preventing the server or Cloud Service 230 from being called by rogue applications or via web browsers. The server or Cloud Service 230 may further include monitoring functions that allow for the detection of fraud and abuse, as well as counterfeit tags. For example, a large number of download requests from a particular user may indicate someone physically accessing an indicator component at a point of sale or other location and "stealing" the tag registrations. The system may include a means for blocking the user and revoking their tag registrations and use privileges.

In some embodiments, a manifest containing content metadata may be created and transmitted to the computing device. In one embodiment, for example, the manifest may include Version, Tag ID, Theme ID, Theme title, Theme subtitle, and Theme version. The Version may identify the client or server version and may be part of the basic information exchanged between Client Application 120 and a server. It may be used to ensure that as the service capabilities evolve, the server can still talk to the older client applications and tailor the download to their capabilities. The TagID may be returned to Client Application 120 for confirmation of the server package targeting. The Theme ID may be a unique identifier for each theme that allows the storage of multiple themes on a single computing device, wherein each download is initiated by a unique tag associated with Initiator Component 210. The Theme title and Theme subtitle may be user-readable elements shown in a list view to the user. The Theme version may be a version number that may be tied to a specific theme ID. A theme might have multiple concurrent versions. For example, a sports theme unique to a specific team might provide several optional versions tied to a single tag. In that event, a particular version could be specified as a default version, and the user may opt to set a specific version as the default for the tag on a computing device or chose to iterate cyclically through the subvariants. The version may also support the distribution of an updated theme package if a theme component or element (e.g., a team song or logo) changes.

In some embodiments, content may have copyright protection or part of a digital rights management (DRM) system(s). As such, the content may not be accessible on computing devices that have not been authorized to access said content. In some embodiments, content may be encoded based upon some combination of a user ID and a specific device ID. Once assembled, the content package may be compressed and then downloaded to Client Application 120, where it may be subsequently decompressed, disassembled, and installed. Client Application 120 associated with Computing Device 220 may support modalities where user confirmation is required prior to installing a theme, as well as modalities where the current theme might be autosaved prior to installation. The two options may allow a user to recover prior themes if they choose to do so.

In some embodiments, a content package may contain content that is licensed. As such, the content package may be secured to ensure that the theme contents of the content package are not accessible to other users. In some embodiments, the content package may contain content that a provider desires to be freely distributed. For example, the content package may include content that is part of a marketing or branding campaign that the provider of the content wants to propagate broadly. In some embodiments, the tag may be accessed by multiple users and computing devices. In some embodiments, Initiator Component 210, including Computer-Readable Tag 110, is configured for public display or access. For example, Initiator Component 210 may be a poster or sign of a size and shape for public display that includes Computer-Readable Tag 110. For example, upon entry into a movie theater, a smartphone might be tapped on a tag associated with the poster advertising a specific movie, allowing movie theme content to be downloaded to the smartphone.

Once the content package has been installed on Computing Device 220, the content or content title may appear in a client window, which may support a list view of the content installed or saved by the user. In some embodiments, the list view displays the content as text. In some embodiments, the list view displays the content as a combination of text and icons, wherein the icons may be an image(s) associated with each theme. Client Application 120 may be configured to allow a user to reactivate any content previously installed on Computing Device 220 from the list view without requiring a re-reading of a tag associated with Initiator Component 210. In some embodiments, the installation of content may result in a subscription for content update notifications. Client Application 120 may be configured to allow update notifications to be displayed to a user through a system notification tray. Client Application 120 may be configured to allow a user to update content with pending updates without requiring the tag or QR code to reinitiate the content. Client Application 120 may be configured to visually display an icon to indicate content with a pending update visually. Client Application 120 may be configured to allow a user to select one of the listed content and inspect its elements/components or delete it in its entirety. In some embodiments, a user may be able to use Client Application 120 to "revoke" their ownership of a specific tag. In some embodiments, Initiator Component 210, including the tag for a specific theme, may be transferable to a third party while deleting that specific theme from a user's device. In some embodiments, the theme package may be shared with one or more third parties. For example, a user may use Client Application 120 on a smartphone to capture a theme package through Computer-Readable Tag 110 (e.g., associated with a movie poster) and subsequently share the theme package with additional users who also have Client Application 120 on their respective smartphones. In some embodiments, the transfer between devices may not be the actual theme package, but only the theme metadata, including the Tag ID value or a URL, captured from the movie poster. The transfer may also include a referral token that may be used in conjunction with registration by the additional users. The transfer of information may be facilitated by NFC (tap to share), Bluetooth, QR code display, or the like.

In some embodiments, Client Application 120 or service may utilize the theme package as a social networking type identifier. For example, when a user with a specific active theme comes into proximity to a second user or users using the same theme, the user's device may be configured to signal the user that someone with a similar interest is in range or close by. For example, a student with a specific college theme attending a conference might be notified if someone with a similar active theme is in range, facilitating networking. In some embodiments, the themes may not be identical but may be related, and the signaling modified subtly. For example, the user's device might signal a user having a character theme from a specific movie franchise if someone is in proximity with a second character theme associated with that same movie franchise.

Figure 3:
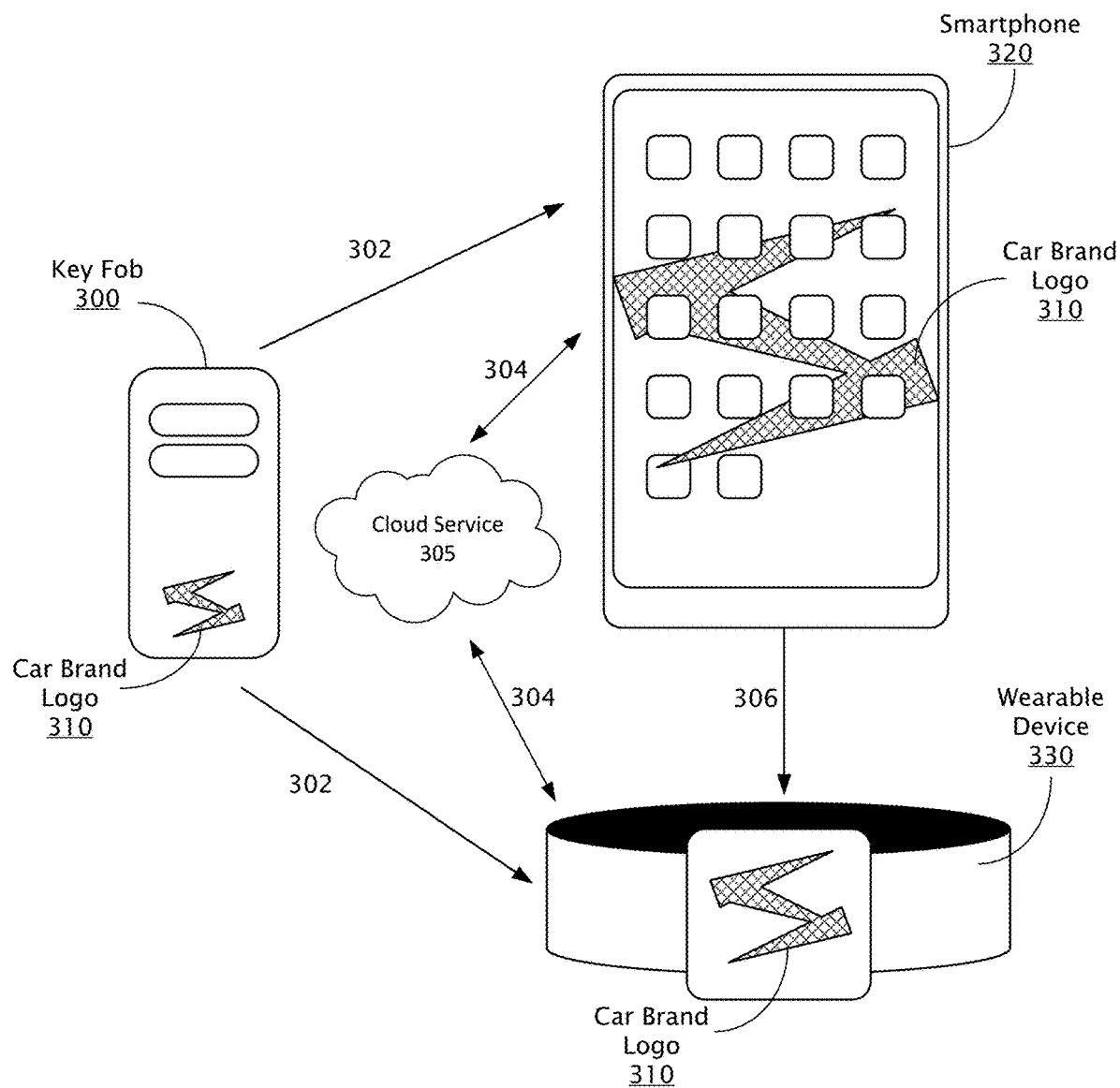
FIG. 3 is an example of customizing a device.

FIG. 3 illustrates an example of customizing a device. Shown in this example is Key Fob 300, including car brand logo 310. Also shown are Smartphone 320 and Wearable Device 330, to which car brand logo 310 has been downloaded based on interaction with Key Fob 300 through Cloud Service 305. Key Fob 300 may include Computer-Readable Tag 110, e.g., an NFC tag, including a Tag ID that may have a unique identifier linked to a car brand. When the key fob, including the computer-readable tag, is in proximity to Smartphone 320, the computer-readable tag may be read by a platform tag reader (see arrow 302), an application is activated. Information from the computer-readable tag may be transmitted to a Cloud Service 305 containing Content Database 130, which may have theme content associated with the car brand. Content Database 130 may provide Smartphone 320 a theme package for the car brand logo (see double arrow 304). Computer-Readable Tag 110 associated with the key fob may also be used to provide the car brand logo to a wearable device using the same or similar systems and methods. In some embodiments, the wearable device has a capable tag reader and access to an application and may be able to directly interact with Content Database 130 to download the car brand logo. In some embodiments, a wearable device indirectly receives the theme package, including the car brand logo, through communication with a smartphone (see arrow 306).

Figure 4:
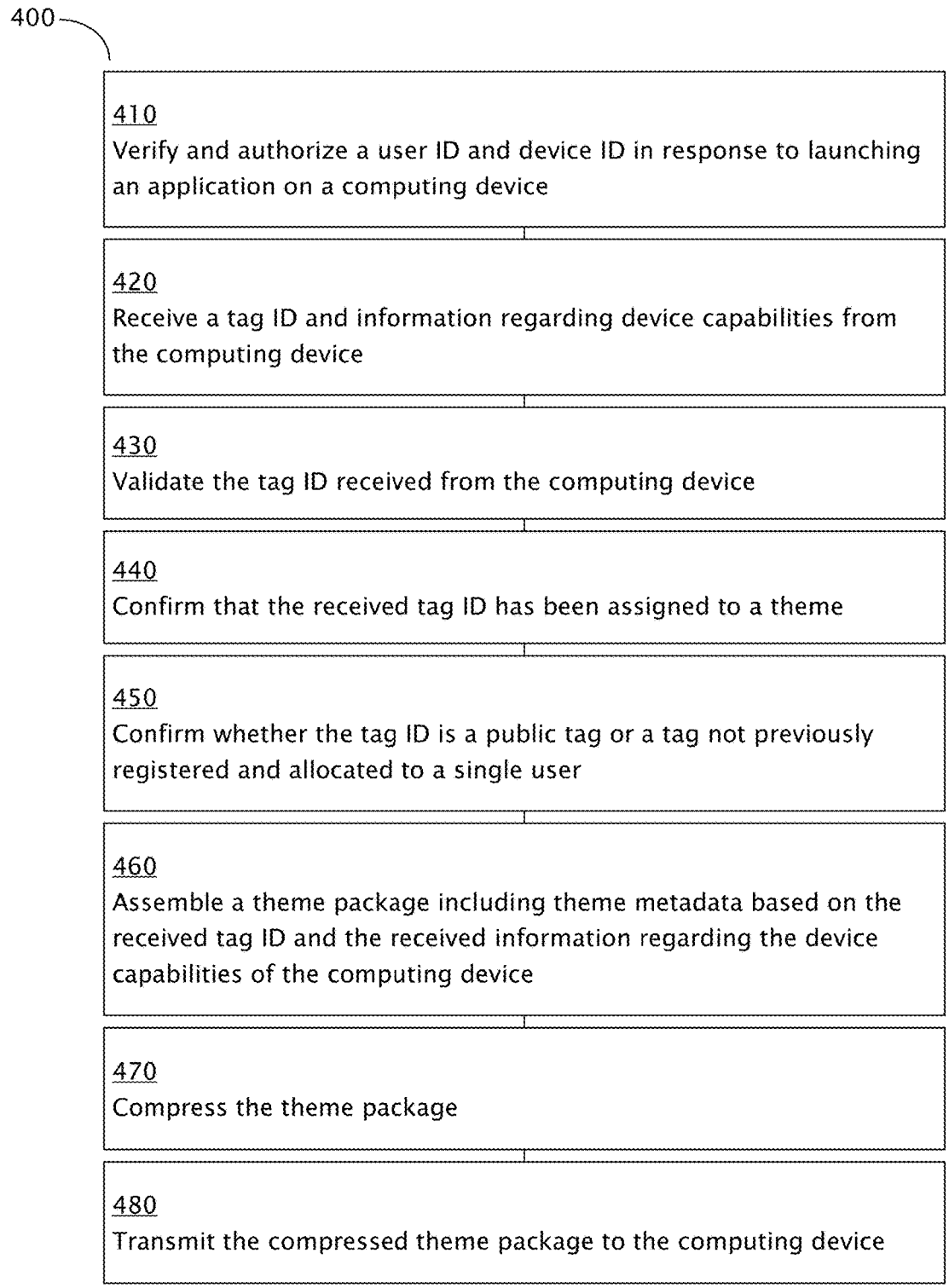
FIG. 4 shows a method for customizing a device.

FIG. 4 shows a block diagram illustrating aspects of a method for customizing a device. Method 400 may include the following steps: verify and authorize a user ID and device ID in response to launching an application on a computing device 410, receive a Tag ID and information regarding device capabilities from the computing device 420, validate Tag ID received from the computing device 430, confirm that the received Tag ID has been assigned to a theme 440, confirm whether the Tag ID is a public tag or a tag not previously registered and allocated to a single user 450, assemble a theme package including theme metadata based on the received Tag ID and the received information regarding the device capabilities of the computing device 460, compress the theme package 470, and transmit the compressed theme package to the computing device 480. It should be understood that the method outlined in FIG. 4 may be carried out in any order and with more or fewer steps. In one embodiment, the method outlined in FIG. 4 may be carried out on a computing device or a computing device associated with a server.

FIG. 5 shows a block diagram illustrating aspects of techniques for customizing a device using a client application. Method 500 may include the following steps: block 510 confirm validity of a user ID; block 520 initialize Client Application 120 in response to a signal from a platform tag reader associated with a computing device; block 530 receive tag information from Computer-Readable Tag 110 through the platform tag reader associated with the computing device; block 540 transmit information regarding a Tag ID, the valid user ID, and device capabilities of the computing device to a web interface as a download request; block 550 receive a compressed theme package and theme metadata from a cloud service; and block 560 decompress, disassemble, and install the theme package on the computing device.

Figure 6:
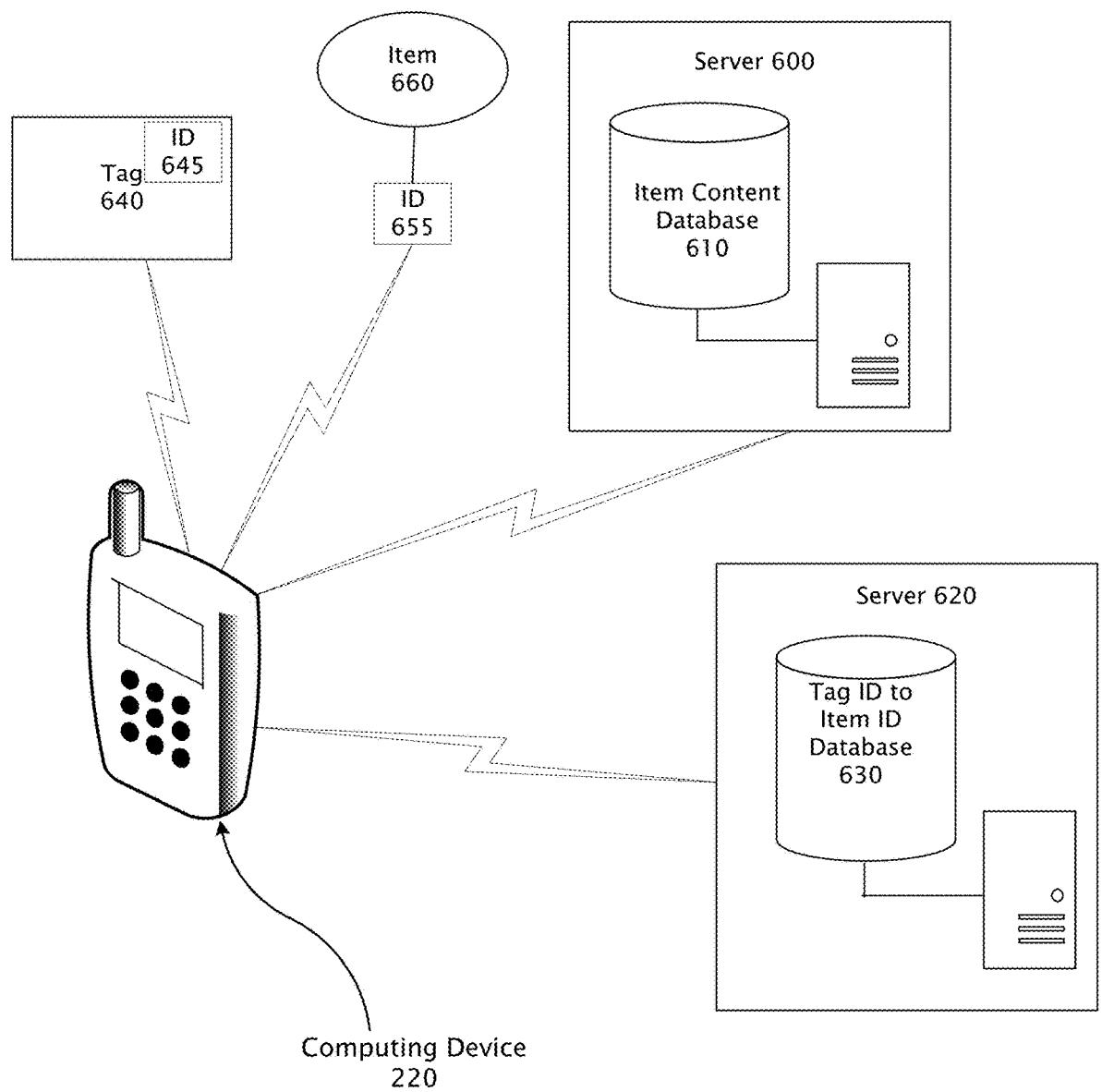
FIG. 6 shows an example of a system that may support dynamic binding for computer-readable tags.

FIG. 6 shows an example of a system that may support dynamic binding for computer-readable tags. Tag 640 may have an ID 645. Tag 640 may be an NFC tag, an RFID tag, a QR code, a bar code, or any other type of computer-readable identifier.

In one example, Computing Device 220 may be used by a provider of a good or service. Computing Device 220 may read Tag 640 and obtain ID 645. Computing Device 220 may obtain ID 655, which may identify an Item 660. Item 660 may be a good, a service, a feature, a poster, or any other thing that may have associated content. ID 655 may be read from another computer-readable identifier, or Computing Device 220 may inherently know ID 655.

For example, if a pharmacy is using dynamic binding for computer-readable tags, each pill bottle may have a tag disposed on it. A pharmacist filling a prescription may use Computing Device 220 to read a tag identifying a medicine placed in a container and may read the tag associated with the container. Computing Device 220 may then update the Tag ID to Item ID Database 630 so that a patient at home can scan the tag on the container and receive instructions or other information about the medication. In other cases, the information related to the specific prescription used may be supplied by the pharmacist's dispensing system, which may update the Tag ID and Item ID to Database 630 to achieve the same patient outcome.

Computing Device 220 may add or update ID 645 and ID 655 to Tag ID to Item ID Database 630 on Server 620, which may associate Tag 640 with ID 655. Item Content Database 610 on Server 600 may contain content related to Item 660, including, for example, text, audio, video, or mixed media files, links to web pages, themes, or any other types of content related to Item 660.

This system may allow the provider to give a user of Item 660 a way to access content related to Item 660 using a computer-readable tag without needing equipment to write to RFID or NFC tags, for example.

In another example, an identifier for Item 660 may already be known in Item Content Database 610.

Figure 7:
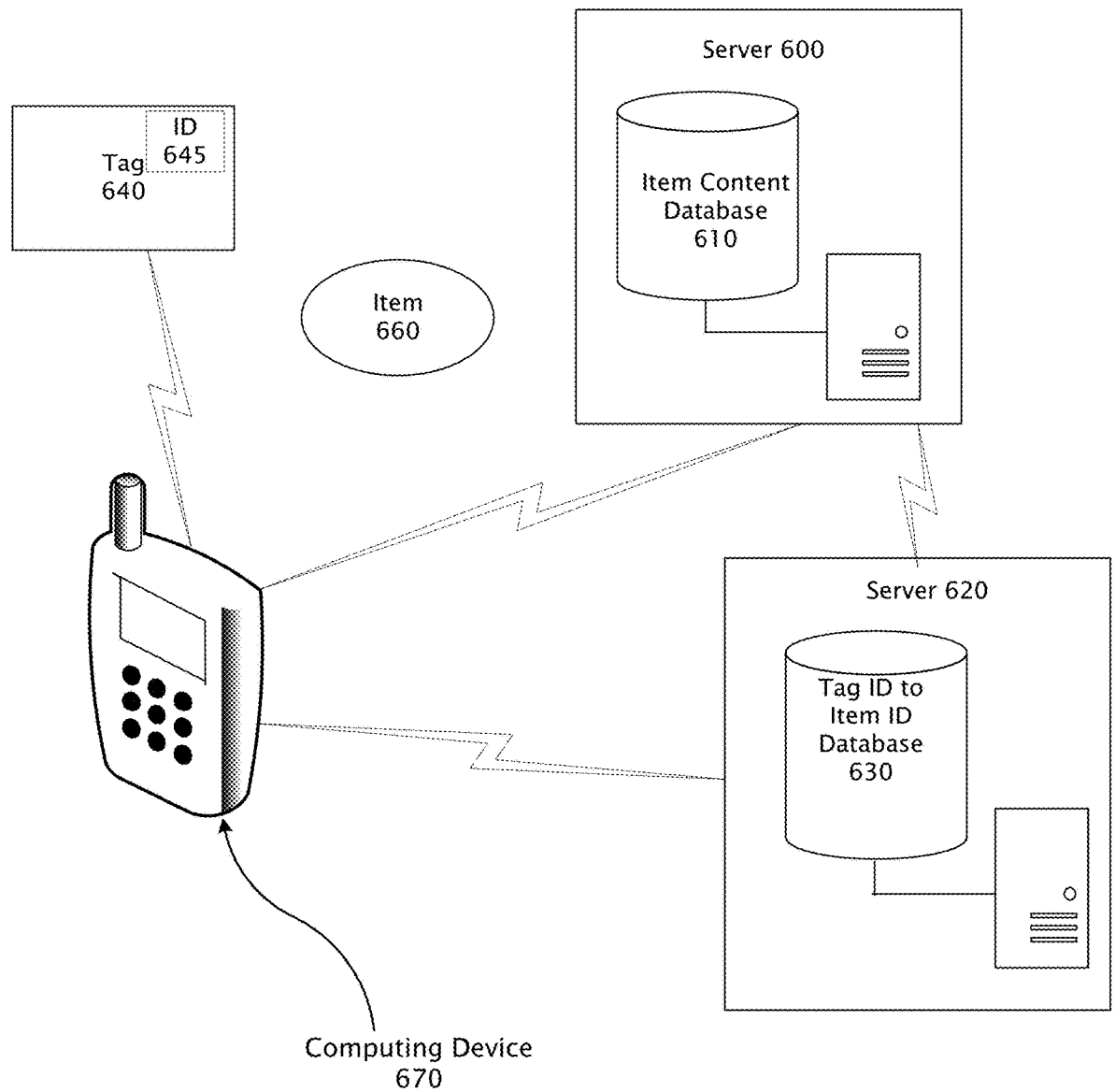
FIG. 7 shows another example of a system that may support dynamic binding for computer-readable tags.

FIG. 7 shows another example of a system that may support dynamic binding for computer-readable tags. In one example, an end-user of Item 660 may use Computing Device 670 to read Tag 640, obtaining ID 645. Computing Device 670 may connect with Server 620 to access Tag ID to Item ID Database 630 to find an associated item ID. Computing Device 670 may then access Item Content Database 610 on Server 600 to obtain content related to Item 660.

Figure 8:
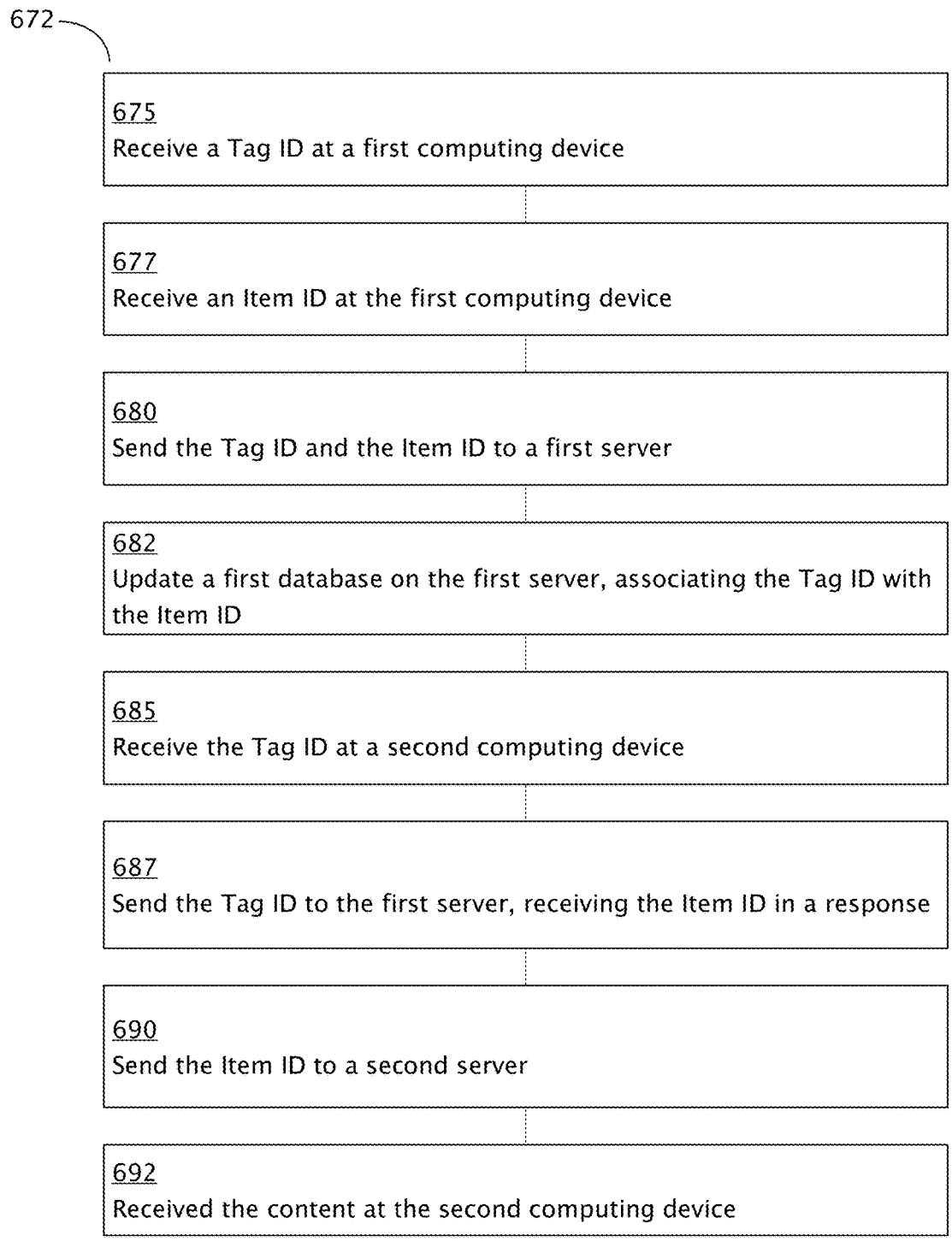
FIG. 8 is a block diagram illustrating aspects of a technique 672 for dynamic binding for computer-readable tags, according to one implementation.

FIG. 8 is a block diagram illustrating aspects of a technique 672 for dynamic binding for computer-readable tags, according to one implementation.

At Step 675, a Tag ID may be received at a first computing device. For example, this may be a pharmacist preparing to have the Tag ID related to a medicine. The Tag ID may be disposed on a container in which the pharmacist will dispense the medicine.

At Step 677, an Item ID may be received at the first computing device in Client Application 120. For the pharmacy example, this may come from a prescription already on the computing device. In other embodiments, for example, this may be read from a second tag.

The Tag ID and the Item ID may be sent 680 by Client Application 120 to a first server, which may have a database that gets updated 682 by associating the Tag ID with the Item ID. In a pharmacy, this may be the Tag ID being associated with the medication or the specific prescription being dispensed.

A second computer may read 685 the Tag ID. For example, a patient may use a smartphone to read the tag on the medicine package the pharmacist dispensed. The Tag ID may be sent 687 to the first server, receiving the Item ID in a response. The Item ID may be sent 690 to a second server, and content associated with the Item ID may be received 692 at the second computer. For the pharmacy example, this may be instructions or other information concerning the medicine dispensed.

In another implementation, for example, a pharmacist may have a prescription open on a computing device and may read a Tag ID, associating the Tag ID with the prescription in a database on a server. When a patient later reads the Tag ID, the prescription information may be sent to the patient's smartphone, for example.

One having skill in the art will recognize that many techniques may be used to associate a Tag ID with an item and that there are many techniques to store an association on a computing device.

Figure 9:
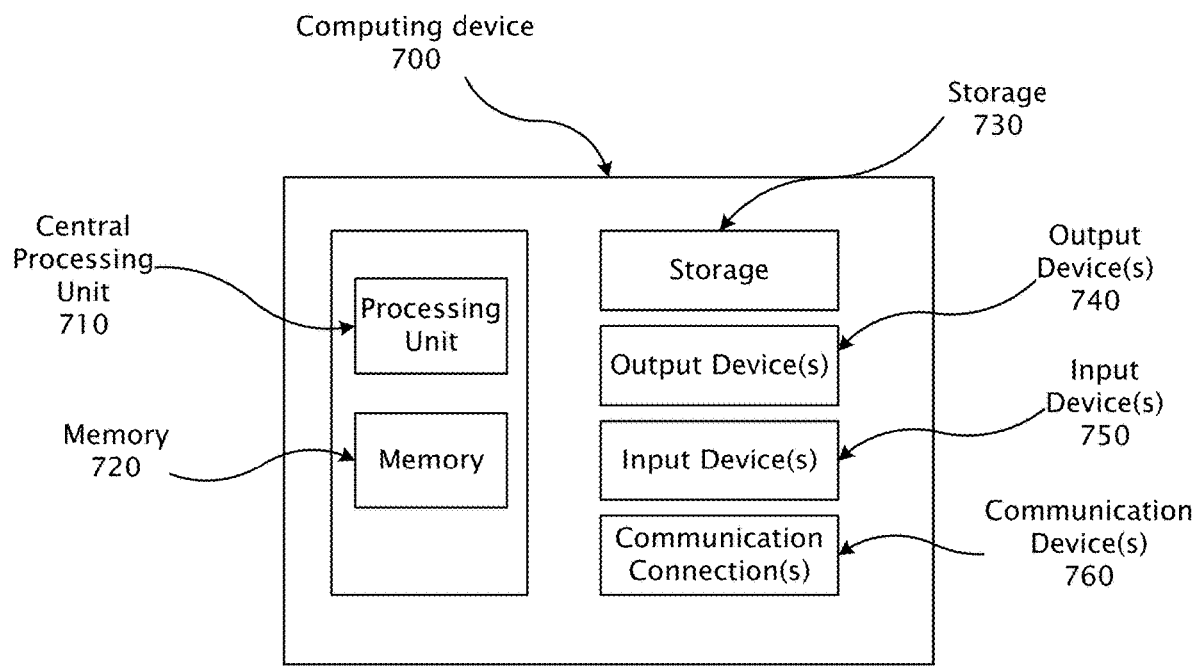
FIG. 9 is a component diagram of a computing device that may support dynamic binding for computer-readable tags, according to one implementation.

FIG. 9 is a component diagram of a computing device that may support dynamic binding for computer-readable tags, according to one implementation. Computing Device 700 may be utilized to implement one or more computing devices, computer processes, or software modules described herein, including, for example, Computing Device 220, Computing Device 670, Smartphone 320, Server 600, or Server 620. In one example, Computing Device 700 may be used to process calculations, execute instructions, and receive and transmit digital signals. In another example, Computing Device 700 may be utilized to process calculations, execute instructions, receive and transmit digital signals, receive and transmit search queries and hypertext, and compile computer code suitable for a mobile device. Computing Device 700 may be any general or special purpose computer now known or to become known capable of performing the steps or performing the functions described herein, either in software, hardware, firmware, or a combination thereof.

In its most basic configuration, Computing Device 700 typically includes at least one Central Processing Unit (CPU) 710 and Memory 720. Depending on the exact configuration and type of Computing Device 700, Memory 720 may be volatile (such as RAM), non-volatile (such as ROM, flash memory, etc.), or some combination of the two. Additionally, Computing Device 700 may also have additional features/functionality. For example, Computing Device 700 may include multiple CPUs. The methods described herein may be executed in any manner by any processing unit in Computing Device 700. For example, the described process(es) may be executed by multiple CPUs in parallel. Computing Device 700 may also include additional storage (removable or non-removable) including, for example, magnetic or optical disks or tape. Such additional storage is illustrated in FIG. 7 by Storage 730. Computer-readable storage media includes volatile and non-volatile, removable and non-removable media implemented in any method of technology for storage of information such as computer-readable instructions, data structures, program modules, or other data. In some embodiments, storage may include storage in a cloud network or server. Memory 720 and Storage 730 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by Computing Device 700. Any such computer-readable storage media may be part of Computing Device 700. But computer-readable storage media does not include transient signals.

Computing Device 700 may also contain Communication Device(s) 760 that allows the device to communicate with other devices. Communications Device(s) 760 is an example of communication media. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. Communication media may include wired media such as a wired network or direct-wired connection, and wireless media such as acoustic, radio frequency (RF), infrared, NFC, and other wireless media. The term computer-readable media, as used herein, includes both computer-readable storage media and communication media. The described methods may be encoded in any computer-readable media in any form, such as data, computer-executable instructions, and the like.

Computing Device 700 may also have input device(s) 750 such as a keyboard, a mouse, a pen, a voice input device, a touch input device, etc. Output device(s) 740, such as a display, speakers, printer, etc., may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download all or a part of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

While the detailed description above has been expressed in terms of specific examples, those skilled in the art will appreciate that many other configurations could be used.

Accordingly, it will be appreciated that various equivalent modifications of the above-described embodiments may be made without departing from the spirit and scope of the invention.

Additionally, the illustrated operations in the description show certain events occurring in a certain order. In alternative embodiments, certain operations may be performed in a different order, modified or removed. Moreover, steps may be added to the above-described logic and still conform to the described embodiments. Further, operations described herein may occur sequentially, or certain operations may be processed in parallel. Yet further, operations may be performed by a single processing unit or by distributed processing units.

While the detailed description above has been expressed in terms of specific examples, those skilled in the art will appreciate that many other configurations could be used. Accordingly, it will be appreciated that various equivalent modifications of the above-described embodiments may be made without departing from the spirit and scope of the invention.

What is claimed is:

1. A system, comprising:
    a first computing device, wherein the first computing device comprises a non-transitory computer-readable tag reader;
    a first non-transitory computer-readable tag, wherein the tag has a unique tag id;
    an item with a distinct item id;
    a first database, wherein the first database is configured to store an association between the tag id and the item by associating the tag id with the distinct item id; and
    a module on the first computing device configured to allow the association to be updated in the first database, wherein the module is further configured to prevent unauthorized updating of the association.

2. The system of claim 1, wherein the item comprises an item id, and the association between the tag id and the item is by associating the tag id with the item id.

3. Non-transitory computer-readable media containing software thereon which, when executed by a processor, performs a method, comprising:
    on a first computer, reading a non-transitory computer-readable tag, giving a unique tag id;
    on the first computer receiving a distinct item id;
    from the first computer, updating non-transitory computer-readable storage to associate the unique tag id and the distinct item id, wherein the updating includes verifying the authenticity of the tag id prior to association;
    on a second computer, reading the tag id;
    from the second computer, sending the tag id to the computer-readable storage;
    on the second computer, receiving content related to the item; and
    on the second computer, providing the content on a user interface.

* * * * *